Patented July 13, 1937

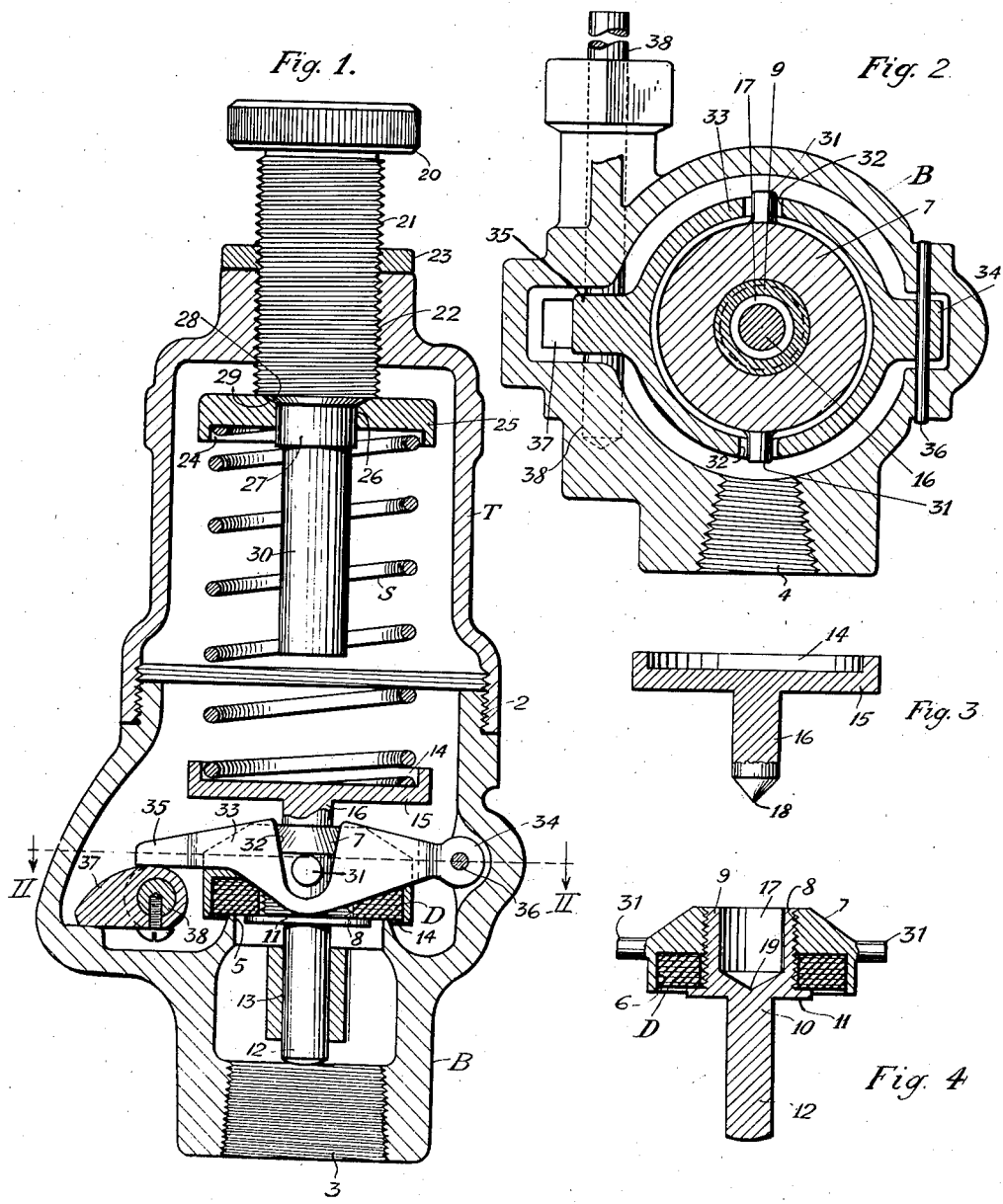

2,086,942

UNITED STATES PATENT OFFICE 2,086,942

PRESSURE RELIEF VALVE

John L. Mandeville, Arlington, N. J., assignor, by mesne assignments, to Union Carbide and Carbon Corporation, a corporation of New York Application January 19, 1931, Serial No. 509,834

10 Claims. (Cl. 137—53)

This invention relates to valves, and more particularly to an improved fluid-pressure relief valve.

The objects of this invention are to provide a fluid-pressure relief valve having a valve disc which will be unseated in response to a predetermined fluid-pressure and a holder for the valve disc which will insure proper seating of the disc and will eliminate any tendency toward binding or misalignment thereof during movement of the disc and holder toward and away from the seat; to provide a valve disc holder which will permit the application of spring pressure at a point at or adjacent the plane of seating of the valve disc; and to provide means cooperating with the holder to unseat the valve disc and which may be operated at will from a point externally of the casing, but which will not interfere with the normal operation of the relief valve.

These and other objects and the novel features of the invention will be apparent from the following description taken with the accompanying drawing, in which, Fig. 1 is a central vertical sectional view of a relief valve embodying this invention, some parts being shown in elevation;

Fig. 2 is a horizontal sectional view of the same, along line II—II of Fig. 1;

Fig. 3 is a vertical sectional view of the spring cup; and

Fig. 4 is a vertical sectional view of the valve disc holder.

The valve shown in the drawing, for the purpose of illustrating one embodiment of the invention, comprises a gas-pressure relief valve especially adapted for use on a medium pressure acetylene generator, but it will be understood that the improvements disclosed may be incorporated in other types of valves than the one here illustrated.

The valve comprises a casing consisting of a bottom or base section B and a top or bonnet section T, secured together by the threads 2. The base section B has threaded inlet and outlet openings 3 and 4, whereby it may be connected, respectively, to a gas or other fluid supply device and to a vent pipe. The base B, within the valve chamber, has an annular boss 5 providing a seat for the annular valve disc D of soft rubber or other suitable material which controls the flow of fluid from the inlet 3 to the outlet 4.

Referring particularly to Fig. 4, the disc D is disposed in a recess 6 in the lower side of a holder 7 which has a central threaded hole 8 therethrough to receive the externally threaded upper end 9 of a retaining member 10. Intermediate its ends, the member 10 has a flange 11 which overlaps and bears against the seating face of the disc D when the end 9 is screwed into the hole 8, thereby clamping the valve disc in the recess 6. Below the flange 11, the member 10 has a central guide stem 12 adapted to project into and slide in a guideway 13 integral with the base B between the inlet 3 and the seat 5, whereby the disc D and the holder assembly are accurately guided in their vertical movements and prevented from binding.

Appropriate yieldable seating pressure is maintained on the disc D by means of an adjustable helical spring S, the lower end of which seats in a cup-shaped recess 14 in a spring cup 15. The pressure on the spring cup 15 is applied to the valve disc holder assembly by a pin or stem 16 on the lower side of the spring cup 15, the stem 16 projecting into a socket 17 in the upper end 9 of the clamping member 10. In order that these parts shall align automatically and more accurately and thus avoid a tendency to bind or stick, the lower end of the stem 16 is tapered to a point 18 in the axis of the cup 15, and the bottom of the socket 17 is tapered to a point 19 in the axis of the member 10 and approximately in the plane of the seating surface of the disc D. The diameter of the stem 16 is substantially smaller than that of the tubular bore of the socket 17, and the lower end of the stem is tapered more sharply than the bottom of the socket. Hence, the point 18 will automatically adjust itself to a single point of contact with and in the axis of the disc holder assembly.

The pressure of the spring S and the relief pressure of the valve disc D may be varied by turning a knurled knob 20 fast on the outer end of an adjusting screw 21 extending into the bonnet T through an opening in the upper end of the latter; said opening and the screw 21 being correspondingly threaded, as at 22, and a suitable lock nut 23 fitting the outer part of the screw to retain the latter in any one of its adjusted positions. The upper end of the spring S seats in a recess 24 in the lower side of a bearing plate 25 which has a central aperture 26 which snugly but slidably fits a reduced section 27 of the adjusting screw 21. Parts of the screw 21 and the hole 26 are correspondingly beveled, as at 28 ar 1 29, to assist in keeping the plate 25 coaxial with the screw 21 so that the screw pressure will be uniformly distributed to the plate and the spring, thus reducing the possibility of misalignment and a tendency to bind. The adjusting screw 21 has an unthreaded reduced portion 30 which extends axially through the spring S to a predetermined distance from the spring cup 15 and serves as a stop to prevent the valve holder from rising too high when the valve is opened. Moreover, the pressure relief adjusting screw 21 is of such a length that, under any condition of manufacturing dimension tolerances, the relief pressure cannot be raised above a predetermined value, say about 20 pounds per square inch when the valve is used in conjunction with a medium pressure acetylene generator.

When the valve is used to protect an acetylene generator, it is necessary that the valve disc be raised off its seat occasionally to insure that it is not adhering to the seat and will operate when required. For this purpose, the valve holder 7 is provided with diametrically-opposite integral trunnions 31. These trunnions 31 are arranged in the path of movement of a pivoted member, and as shown in Fig. 1 are positioned in diametrically-opposite tapered recesses 32 in the upper edge of an annular yoke 33 which encircles the disc holder assembly. At points 90° circumferentially from the recesses 32, the yoke 33 has diametrically-opposite lugs 34 and 35. The lug 34 is apertured to receive a pivot pin 36 mounted in the casing section B, whereby the yoke is hinged at this point. By swinging or moving the yoke upwardly about its pivot, the valve disc holder may be lifted to raise the valve disc D off its seat. To accomplish this, suitable means, such as the cam 37, may be arranged to engage the lug 35 at the free end of the yoke and lift the same the necessary distance. The cam 37 is secured to a shaft 38 rotatably mounted in the base B, and the shaft may be turned the required amount by a hand crank or by suitable interference mechanism which is usually operated when an acetylene generator is recharged.

The nature and operation of the invention will be apparent from the foregoing description and, while the various features have been described in detail, it will be understood that numerous changes may be made in such details without departing from the principles of the invention or sacrificing its advantages.

I claim:

1. In a valve, the combination of an annular valve disc; an annular holder therefor having diametrically-opposite trunnions; an annular yoke encircling said holder and having recesses into which said trunnions project; means pivotally supporting said yoke; and means whereby said yoke is rockable on its pivotal support.

2. In a valve, the combination of a holder comprising two detachably-connected members, one of said members having a recess; packing material forming an annular valve disc in said recess; the other of said members having on one side thereof a portion provided with a socket and extending through said recessed member, and on the other side thereof having a flange adapted to bear against the inner peripheral seating surface of said disc and a depending portion adapted to axially guide said holder and said disc; and resilient means including a member projecting into said socket for applying pressure to said holder.

3. In a valve, the combination of an annular valve disc, a slidable valve-disc holder having diametrically-opposite trunnions and having an elongated valve-guide portion and a central recess, an annular yoke surrounding the said holder and having slots into which the respective trunnions extend for free rocking movement with respect to the yoke and for free movement of the holder towards and away from the said yoke, means pivotally supporting the said yoke, and means for rocking the said yoke on its pivotal support.

4. In a valve, the combination of an annular valve disc, a slidable valve-disc holder having diametrically-opposite trunnions and having an elongated valve guide portion at one end and a central recess at the other end, the said recess having a conical bottom disposed adjacent the annular disc, adjustable loading means having a point-bearing surface adapted to ride freely upon the said conical bottom for applying and centering a selected load upon the said disc holder, an annular yoke surrounding the said holder and having recesses into which the respective trunnions extend for free rocking movement of the holder and for free longitudinal movement of the holder independently of the said yoke, means pivotally supporting the yoke, and means for rocking the yoke on its pivotal support.

5. In a valve, the combination of an annular valve disc, a longitudinally movable annular holder therefor having diametrically-opposite trunnions, an annular yoke encircling said holder and having tapered recesses into which said trunnions extend, means operatively associated with the yoke midway of the said recesses for supporting the yoke for pivotal movement along an axis disposed transversely with respect to the path of movement of the valve holder, and means for rocking said yoke on its pivotal support.

6. A valve structure comprising a valve disc; a valve disc holder including two members adapted to clamp said valve disc therebetween, the first of said members having a recess adapted to permit the application of pressure adjacent the plane of seating of said valve disc, and the second of said members being adapted to be raised so as to unseat said valve disc; means operatively associated with said second member for raising the valve holder; and resilient means adapted to apply pressure in the recess of said first member adjacent the plane of seating of said valve disc for depressing said holder.

7. In a valve, the combination of a seat; a valve disc; a valve disc holder movable relatively to said seat, said holder comprising two members, the first of said members having a socket and the second of said members having projections on two opposite sides thereof; means resting in said socket for applying pressure to said holder; means for guiding said holder and said disc to and from said seat; a member pivoted adjacent a third side of said second member and adapted to engage said projections to unseat said valve disc; and means pivoted adjacent a fourth side of said second member and adapted to engage and operate said pivoted member so as to cause said pivoted member to unseat said valve disc.

8. In a valve, the combination of a holder having an annular recess in one face thereof and a threaded hole extending centrally through said holder; an annular yieldable valve disc in said recess; resilient means for applying pressure to said valve and a retaining and guiding member having an externally-threaded portion secured in said threaded hole, said member having a flange which clamps said disc in said recess, one end of said member having a depending portion adapted to guide said valve and the other end thereof having a socket axially in line with said depending portion and within said externally-threaded portion to receive said means for applying pressure to said valve.

9. In a valve, the combination of a holder comprising two detachably connected members one of which has an annular recess; packing material forming a valve disc held in said recess; the other of said members having a guide portion and having an extension in which is formed a socket provided with a bottom conical throughout its extent; said extension being projected through the disc and having a flange bearing against the seating face of said disc at its inner periphery to retain the disc in the recess; and resilient means including a member projected into the socket of the holder for applying pressure to the holder; said last named member being of sufficiently smaller diameter than the socket to prevent any binding between the member and the walls of the socket and having a conical end self-centering in the conical bottom of the socket.

10. In a valve, the combination of a casing having an inlet and an outlet; a seat in said casing between said inlet and said outlet; an annular valve disc cooperating with said seat to control the flow of fluid through said casing and adapted to automatically unseat at a predetermined fluid pressure at said inlet; a holder for said disc comprising two detachably-connected members, one of said members having an annular recess retaining said disc and also having diametrically opposite trunnions, the other of said members having a socket tapering to a point at its bottom in the axis of said holder and in the plane of the seating face of said disc, said other member also having a flange bearing against said seating face and a depending guide portion; means for applying pressure to said holder comprising a spring, a cup providing a bearing for one end of said spring and having a pointed stem bearing against said point in the bottom of said socket, means accessible from outside said casing for varying the pressure of said spring and having an extension inside said casing to limit the movement of said holder; and means operable independently of the fluid pressure for unseating said disc comprising an annular yoke encircling said holder and having recesses receiving said trunnions, a lug on said yoke whereby the latter is pivoted inside said casing, a second lug on said yoke, a cam inside said casing adapted to engage said second lug and rock the yoke on its pivot, and operating means secured to said cam and extending outside said casing.

JOHN L. MANDEVILLE.